US006939924B2

(12) United States Patent
Kim et al.

(10) Patent No.: US 6,939,924 B2
(45) Date of Patent: Sep. 6, 2005

(54) GOLF BALL INCORPORATING URETHANE COMPOSITION

(76) Inventors: Hyun Jin Kim, 5545 Fermi Ct., Carlsbad, CA (US) 92008; Hong Guk Jeon, 5545 Fermi Ct., Carlsbad, CA (US) 92008

(*) Notice: Subject to any disclaimer, the term of this patent is extended or adjusted under 35 U.S.C. 154(b) by 180 days.

(21) Appl. No.: 10/385,062

(22) Filed: Mar. 10, 2003

(65) Prior Publication Data

US 2004/0181014 A1 Sep. 16, 2004

(51) Int. Cl.$^7$ ............................................. A37B 37/12
(52) U.S. Cl. ........................ 525/457; 525/458; 473/354; 473/365; 473/371; 473/374; 473/377; 473/378
(58) Field of Search .............................. 525/457, 458; 473/354, 365, 371, 374, 377, 378

(56) References Cited

U.S. PATENT DOCUMENTS

| | | | | |
|---|---|---|---|---|
| 4,068,849 A | | 1/1978 | DiSalvo et al. ............ 273/218 |
| 4,248,432 A | | 2/1981 | Hewitt et al. ............. 273/235 |
| 5,792,008 A | * | 8/1998 | Kakiuchi et al. ........... 473/354 |
| 5,929,189 A | | 7/1999 | Ichikawa et al. ........... 528/76 |
| 6,018,012 A | | 1/2000 | Crast et al. ............... 528/73 |
| 6,054,550 A | | 4/2000 | Umezawa et al. .......... 528/76 |
| 6,096,851 A | | 8/2000 | Maruoka et al. ........... 528/85 |
| 6,117,024 A | | 9/2000 | Dewanjee ................. 473/351 |
| 6,123,628 A | | 9/2000 | Ichikawa et al. ........... 473/371 |
| 6,190,268 B1 | | 2/2001 | Dewanjee ................. 473/370 |
| 6,210,294 B1 | | 4/2001 | Wu ......................... 473/377 |
| 6,210,295 B1 | | 4/2001 | Yoneyama ................ 473/378 |
| 6,213,892 B1 | | 4/2001 | Felker et al. .............. 473/370 |
| 6,309,313 B1 | | 10/2001 | Peter ...................... 473/378 |
| 6,309,706 B2 | | 10/2001 | Maruoka et al. ........... 427/385.5 |
| 6,312,347 B1 | | 11/2001 | Keller ..................... 473/371 |
| 6,365,679 B1 | | 4/2002 | Crast et al. ............... 525/440 |
| 6,371,870 B1 | | 4/2002 | Calabria et al. ........... 473/370 |
| 6,392,002 B1 | | 5/2002 | Wu ......................... 528/76 |
| 6,422,954 B1 | | 7/2002 | Dewanjee ................. 473/378 |
| 6,435,986 B1 | | 8/2002 | Wu et al. ................. 473/378 |
| 6,435,987 B1 | | 8/2002 | Dewanjee ................. 473/378 |
| 6,458,307 B2 | | 10/2002 | Inoue et al. .............. 264/232 |
| 6,476,176 B1 | | 11/2002 | Wu ......................... 528/76 |
| 6,482,345 B1 | | 11/2002 | Dewanjee ................. 264/254 |
| 6,486,261 B1 | | 11/2002 | Wu et al. ................. 525/332.6 |
| 6,632,147 B2 | * | 10/2003 | Cavallaro et al. .......... 473/374 |
| 2001/0003717 A1 | | 6/2001 | Maruoka et al. ........... 473/371 |
| 2001/0050447 A1 | | 12/2001 | Inoue et al. .............. 264/232 |
| 2002/0006837 A1 | | 1/2002 | Dalton et al. ............. 473/361 |
| 2002/0016435 A1 | | 2/2002 | Simonutti et al. .......... 528/59 |
| 2002/0049099 A1 | | 4/2002 | Peter ...................... 473/378 |
| 2002/0052251 A1 | | 5/2002 | Iwami .................... 473/356 |
| 2002/0086743 A1 | | 7/2002 | Bulpett et al. ............ 473/371 |
| 2002/0091018 A1 | | 7/2002 | Sasaki et al. ............. 473/367 |
| 2002/0098917 A1 | | 7/2002 | Iwami .................... 473/374 |
| 2002/0098918 A1 | | 7/2002 | Wu et al. ................. 473/377 |
| 2002/0155905 A1 | | 10/2002 | Iwami .................... 473/374 |
| 2002/0160863 A1 | | 10/2002 | Wu et al. ................. 473/378 |
| 2002/0167116 A1 | | 11/2002 | Inoue et al. .............. 264/331.11 |
| 2004/0132899 A1 | * | 7/2004 | Sullivan .................. 524/590 |

* cited by examiner

*Primary Examiner*—David J. Buttner
(74) *Attorney, Agent, or Firm*—Sheppard, Mullin, Richter & Hampton LLP

(57) ABSTRACT

Golf ball covers and intermediate layers incorporate the reaction product of a thermoplastic urethane and a modified isocyanate to form a crosslinked polyurethane. The layers exhibit the ease of processing of a thermoplastic urethane, with the superior mechanical properties of a thermoset urethane.

29 Claims, No Drawings

GOLF BALL INCORPORATING URETHANE COMPOSITION

BACKGROUND OF THE INVENTION

The present invention relates to compositions for use in making inner covers, outer covers, and intermediate layers for a golf ball, and it more specifically relates to such golf ball layers incorporating polyurethane. The present invention also relates to methods of manufacture of golf balls incorporating these layers.

Golf balls generally include a core and at least one cover layer surrounding the core. Balls can be classified as two-piece, multi layer, or wound balls. Two-piece balls include a spherical inner core and an outer cover layer. Multi-layer balls include a core, a cover layer and one or more intermediate (or mantle) layers. The intermediate layers themselves may include multiple layers. Wound balls include a core, a rubber thread wound under tension around the core to a desired diameter, and a cover layer, typically of balata material.

Generally, two-piece balls provide good durability and ball distance when hit, but they provide poor ball control, due to low spin rate and poor "feel" (the overall sensation transmitted to the golfer while hitting the ball). Wound balls having balata covers generally have high spin rate, leading to good control, and good feel, but they have short distance and poor durability in comparison to two-piece balls. Multi-layer balls generally have performance characteristics between those of two-piece and wound balls. Multi-layer balls exhibit distance and durability inferior to two-piece balls but superior to wound balata balls, and they exhibit feel and spin rate inferior to wound balata balls but superior to two-piece balls.

Material characteristics of the compositions used in the core, cover, and any intermediate layers are important in determining the performance of the resulting golf balls. In particular, the composition of the cover layer is important in determining the ball's durability, scuff resistance, speed, shear resistance, spin rate, feel, and "click" (the sound made when a golf club head strikes the ball). Various materials having different physical properties are used to make cover layers to create a ball having the most desirable performance possible. For example, many modern cover layers are made using soft or hard ionomer resins, elastomeric resins or blends of these. Ionomeric resins used generally are ionic copolymers of an olefin and a metal salt of a unsaturated carboxylic acid, or ionomer terpolymers having a co-monomer within its structure. These resins vary in resiliency, flexural modulus, and hardness. Examples of these resins include those marketed under the name SURLYN manufactured by E.I. DuPont de Nemours & Company of Wilmington, Del., and IOTEK manufactured by Exxon Mobil Corporation of Irving, Tex. Elastomeric resins used in golf ball covers include a variety of thermoplastic or thermoset elastomers available. Layers other than cover layers also significantly affect performance of a ball. The composition of an intermediate layer is important in determining the ball's spin rate, speed, and durability. The composition and resulting mechanical properties of the core are important in determining the ball's coefficient of restitution (C.O.R.), which affects ball speed and distance when hit. In addition to the performance factors discussed above, processability also is considered when selecting a formulation for a golf ball composition. Good processability allows for ease of manufacture using a variety of methods known for making golf ball layers, while poor processability can lead to avoidance of use of particular materials, even when those materials provide for good mechanical properties.

Various materials having different physical properties are used to make ball layers to create a ball having the most desirable performance possible. Each of the materials discussed above has particular characteristics that can lead to ball properties when used in a golf ball composition, either for making a ball cover, intermediate layer, or core. However, one material generally cannot optimize all of the important properties of a golf ball layer. Properties such as feel, speed, spin rate, resilience and durability all are important, but improvement of one of these properties by use of a particular material often can lead to worsening of another. For example, ideally, a golf ball cover should have good feel and controllability, without sacrificing ball speed, distance, or durability. Despite the broad use of copolymeric ionomers in golf balls, their use alone in, for example, a ball cover can be unsatisfactory. A cover providing good durability, controllability, and feel would be difficult to make using only a copolymeric ionomer resin having a high flexural modulus, because the resulting cover, while having good distance and durability, also will have poor feel and low spin rate, leading to reduced controllability of the ball. Also, the use of particular elastomeric resins alone can lead to compositions having unsatisfactory properties, such as poor durability and low ball speed.

Therefore, to improve golf ball properties, the materials discussed above can be blended to produce improved ball layers. Prior compositions for golf balls have involved blending high-modulus copolymeric ionomer with, for example, lower-modulus copolymeric ionomer, terpolymeric ionomer, or elastomer. As discussed above, ideally a golf ball cover should provide good feel and controllability, without sacrificing the ball's distance and durability. Therefore, a copolymeric ionomer having a high flexural modulus often is combined in a cover composition with a terpolymeric ionomer or an elastomer having a low flexural modulus. The resulting intermediate-modulus blend possesses a good combination of hardness, spin and durability.

However, even with blending of materials to improve ball properties, use of the materials and blends discussed above has not been completely satisfactory. Improving one characteristic can lead to worsening of another. For example, blending an ionomer having a high flexural modulus with an ionomer having a low flexural modulus can lead to reduced resilience and durability compared to use of the high-modulus ionomer alone. Also, the hardness of the compositions that can be obtained from these blends are limited, because durability and resilience get worse when hardness is lowered by increasing terpolymeric content of these blends. In general, it is difficult to make materials for use in, for example, a golf ball cover layer that possess good feel, high speed, high resilience, and good shear durability, and that are within a wide range of hardness. Additional compositions meeting these criteria are therefore needed.

Conventionally, golf ball cover and intermediate layers are positioned over a core or other internal layer using one of three methods: casting, injection molding, or compression molding. Of the three methods, injection molding is most preferred, due to the efficiencies gained by its use. Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. The mold sections are connected to openings, or gates, evenly distributed near or around the parting line, or point of intersection, of the mold sections through which the material to be molded flows into the cavity. The gates are connected to a runner and a sprue that serve to channel the molding material through the gates. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold. In the case of a heated mold, thermal energy is applied to the material in the mold so that a chemical reaction may take place in the material. Because thermoset materials have desirable mechanical properties, it would be beneficial to producers of golf balls using this process. Unfortunately, thermoset materials generally are not well suited for injection molding, because as the reactants for thermoset polyurethane are mixed, they begin to cure and become highly viscous while traveling through the sprue and into the runners of the injection mold, leading to injection difficulties. For this reason, thermoset materials typically are formed into a ball layer using a casting process free of any injection molding steps.

In contrast to injection molding, which generally is used to prepare layers from thermoplastic materials, casting often is used to prepare layers from thermoset material (i.e., materials that cure irreversibly). In a casting process, the thermoset material is added directly to the mold sections immediately after it is created. Then, the material is allowed to partially cure to a gelatinous state, so that it will support the weight of a core. Once cured to this state, the core is positioned in one of the mold sections, and the two mold sections are then mated. The material then cures to completion, forming a layer around the core. The timing of the positioning of the core is crucial for forming a layer having uniform thickness. The equipment used for this positioning are costly, because the core must be centered in the material in its gelatinous state, and at least one of the mold sections, after having material positioned therein, must be turned over and positioned onto its corresponding mold section. Casting processes often lead to air pockets and voids in the layer being formed, resulting in a high incidence of rejected golf balls. The cost of rejected balls, complex equipment, and the exacting nature of the process combine to make casting a costly process in relation to injection molding.

Compression molding of a ball layer typically requires the initial step of making half shells by injection molding the layer material into a cold injection mold. The half shells then are positioned in a compression mold around a ball core, whereupon heat and pressure are used to mold the half shells into a complete layer over the core. Compression molding also can be used as a curing step after injection molding. In such a process, an outer layer of thermally curable material is injection molded around a core in a cold mold. After the material solidifies, the ball is removed and placed into a mold, in which heat and pressure are applied to the ball to induce curing in the outer layer.

One material used in ball layers is polyurethane. Polyurethane typically is formed as the reaction product of a diol or polyol, along with an isocyanate. The reaction also can incorporate a chain extender configured to harden the polyurethane formed by the reaction. Thermoplastic polyurethanes have generally linear molecular structures and incorporate physical crosslinking that can be reversibly broken at elevated temperatures. As a result, thermoplastic polyurethanes can be made to flow readily, as is required for injection molding processes. In contrast, thermoset polyurethanes have generally networked structure that incorporate irreversible chemical crosslinking. As a result, thermoset polyurethanes do not flow freely, even when heated.

Thermoplastic and thermoset polyurethanes both have been used in golf ball layers, and each provides for certain advantages. Because of their excellent flowability, thermoplastic polyurethanes can be positioned readily around a golf ball core using injection molding. Unfortunately, golf ball covers comprising thermoplastic polyurethane exhibit poor shear-cut resistance. Thus, while thermoplastic polyurethane covers are less expensive to make due to their superior processability, they are not favored due to the resulting inferior ball performance. In contrast, thermoset polyurethane exhibits high shear-cut resistance and is much more scuff- and cut-resistant than thermoplastic polyurethane. However, the irreversible crosslinks in the thermoset polyurethane structure make it unsuitable for use in injection molding processes conventionally used for thermoplastic materials.

Despite their drawbacks, thermoplastic polyurethanes are used in golf ball compositions. U.S. Pat. No. 5,759,676 to Wu discloses thermoplastic polyurethane utilized in blends for mantle and cover layers. U.S. Pat. No. 6,319,152 to Takesue teaches blending of a thermoplastic polyurethane with a styrene-based block copolymer to increase the scuff resistance of the resulting golf ball cover. The patent discloses that because thermoplastic polyurethanes are "inexpensive and easy to mold, these elastomers are regarded as an excellent cover stock substitute for balata material. However, the thermoplastic polyurethane elastomers are still insufficient in scuff resistance upon iron shots." Thermoplastic polyurethanes also are used for making mantle layers to give the feel of a wound ball to non-wound constructions. Such a mantle is disclosed in U.S. Pat. No. 5,759,676 to Cavallaro et al.

Though they are more expensive to process than thermoplastic polyurethanes, thermoset polyurethanes also have been used in golf ball layers. For example, U.S. Pat. No. 6,132,324 to Hubert discloses a golf ball having a cover formed from thermoset polyurethane. The patent teaches a method for casting a thermoset polyurethane cover over an ionomer inner layer, including a step of measuring the viscosity "over time, so that the subsequent steps of filling each mold half, introducing the core into one half and closing the mold can be properly timed for accomplishing centering of the core cover halves fusion and overall uniformity." The additional steps involved in casting a layer over those needed for injection molding the layer lead to added complexity and expense. Another patent discussing use of thermoset polyurethane is U.S. Pat. No. 6,435,987 to Dewanjee. This patent teaches thermosetting polyurethane comprising a toluene diisocyanate-based prepolymer, a second diisocyanate prepolymer, and a curing agent. Again, this method makes use of casting because the materials used would not be well suited to injection molding. One attempt to successfully use thermoplastic polyurethane in golf ball covers is disclosed in U.S. Pat. No. 6,123,628 to Ichikawa et al. This patent discloses golf ball covers incorporating the reaction product of a thermoplastic polyurethane with an isocyanate compound. In this patent, the crosslinking reaction is completed during extrusion. The completed golf ball covers are thermoplastic, and they provide for improved scuff resistance, though they do not exhibit improvements in other mechanical properties In view of the above, it is apparent that polyurethane golf balls that provide the optimal ball performance properties, while demonstrating ease of manufacture, as well as methods for making these balls, are needed. The present invention fulfills this need and provides further related advantages.

SUMMARY OF THE INVENTION

The present invention is embodied in a golf ball having a core and a cover layer encasing the core, the golf ball incorporating a composition comprising the reaction product of: 1) a thermoplastic urethane formed as a reaction product of a diol or a polyol with an isocyanate; and 2) a modified isocyanate. Golf balls within the scope of the present invention can incorporate the composition in their cover or intermediate layers. These layers can be used with balls having inner and outer cores, liquid cores, or rubber thread layers between the core and cover layer.

The modified iscocyanate preferably is selected from the group consisting of: isophorone diisocyanate (IPDI)-based uretdione-type crosslinker; a combination of a uretdione adduct o f IPDI and a partially ε-caprolactam-modified IPDI; a combination of isocyanate adducts modified by ε-caprolactam and a carboxylic acid functional group; a caprolactam-modified Desmodur diieocyanate; a Desmodur diiscoyanate having a 3,5-dimethyl pyrazole modified isocyanate; or mixtures of these.

The thermoplastic urethane can incorporate at least one chain extender, preferably comprising diol, polyol, diisocyanate, polyisocyanate, diamine, polyamine, or mixtures of these. The polyol preferably is polyester polyol, polycarbonate polyol, polyether polyol, polybutadiene polyol, or mixtures of these. The ratio in the composition by weight of thermoplastic urethane to modified isocyanate preferably ranges between 99.9:0.1 and about 60:40, more preferably between 99.9:0.1 and about 70:30, more preferably between about 98:2 and about 80:20, and most preferably between about 98:2 and about 90:10.

In various preferred embodiments of the present invention, the composition further includes: plasticizer, UV stabilizers, photostabilizers, antioxidants, colorants, dispersants, mold releasing agents, processing aids, fillers, or mixtures of these. The composition also may incorporate ionomeric polymer, non-ionomeric polymer, polyamide, silicone, styrenic-copolymers, or mixtures of these. The thermoplastic urethane preferably is ester-type thermoplastic urethane, ether-type thermoplastic urethane, or mixtures of these. In a preferred embodiment, the thermoplastic urethane is substantially free of unsaturated hydrocarbons.

The present invention also resides in a method for preparing a golf ball layer, including the steps of: 1) preparing a composition that is the reaction product of (a) a thermoplastic urethane formed as the reaction product of a diol or polyol, and an isocyanate; and (b) a modified isocyanate; and then inducing crosslinking or polymerization in the composition by adding thermal energy to the composition, such that a temperature of the composition is greater than a characteristic temperature the modified isocyanate, to create a crosslinked polyurethane. The isocyanate in (a) also can incorporate a modified isocyanate. In preferred aspects of the method, the step of forming the composition into a layer includes injection molding the composition to form the layer. The step of preparing the composition can incorporate dry-blending the composition, or mixing the composition using a mill, internal mixer or extruder, as well as into the composition ionomeric polymer, non-ionomeric polymer, polyamide, silicone, styrenic-copolymers, or mixtures of these. The step of preparing the composition also can incorporate: premixing the modified isocyanate with the ionomeric polymer, non-ionomeric polymer, polyamide, silicone material, styrenic-copolymers, or mixtures of these to define a concentrate; and, introducing the concentrate into a mixture of the thermoplastic urethane and ionomeric polymer, non-ionomeric polymer, polyamide, silicone, copolymers incorporating epoxy monomers, or mixture of these. Additionally, the step of preparing the composition can include: forming pellets from the thermoplastic urethane; and, coating the pellets with the modified isocyanate.

In a preferred aspect of the method, the steps of preparing a composition and forming the composition into a layer take place under conditions of temperature and pressure such that substantially no crosslinking occurs in the composition during these steps. In a preferred aspect of the method, the step of forming a layer incorporates forming the composition into half cups, and then positioning the half cups a golf ball core, so that the half cups form a layer and the inner core is enclosed by this layer.

The present invention also resides in a method for molding a golf ball layer over an inner core of a golf ball, including the steps of: 1) preparing a composition incorporating a thermoplastic urethane formed as a reaction product of: a diol or polyol, and an isocyanate; 2) forming the composition into half cups; 3) coating the half cups with a modified isocyanate; 4) positioning the half cups over the inner core so that the inner core is covered by the half cups; 5) inducing crosslinking or polymerization in the composition by increasing thermal energy to and pressure on the half cups, so that a temperature of the composition is greater than a characteristic temperature of the modified isocyanate, and so that the half cups are bonded together to form a layer.

The present invention also resides in a method for molding a golf ball layer over an inner core of a golf ball, including the steps of: 1) preparing a composition comprising thermoplastic urethane formed as a reaction product of a diol or polyol, and an isocyanate; 2) forming a layer of the composition around the inner core, so that the inner core is covered by the layer; 3) coating the layer with a modified isocyanate; and 4) inducing crosslinking or polymerization in the composition by increasing thermal energy to and pressure on the layer, so that the temperature of the composition is greater than a characteristic temperature of the modified isocyanate.

The present invention also resides in a method preparing a golf ball layer, incorporating the steps of: 1) preparing a composition comprising the reaction product of (a) a diol or polyol, (b) an isocyanate, and (c) a modified isocyanate; and 2) inducing crosslinking in the composition by adding thermal energy to the composition, so that the temperature of the composition is greater than a characteristic temperature of the modified isocyanate, to create a crosslinked polyurethane. The step of preparing the reaction product can incorporate using a reaction injection molding technique or a casting process.

The present invention also resides in a method for preparing a golf ball layer, incorporating the steps of: 1) preparing a reaction product of a) a urethane prepolymer incorporating an isocyanate and a diol or polyol; and (b) a curing agent incorporating a modified isocyanate or a mixture of a modified isocyanate and a diol, polyol, diisocyanate, polyisocyanate, diamine, polyamine, or mixture of these; and 2) inducing crosslinking in the composition by adding thermal energy to the composition, so that a temperature of the composition is greater than a characteristic temperature of the modified isocyanate, to create a crosslinked polyurethane. The step of preparing the reaction product can incorporate using a reaction injection molding technique or a casting process.

The present invention also resides in a method for preparing a golf ball layer, including the steps of 1) preparing a composition incorporating the reaction product of (a) a urethane prepolymer comprising a modified isocyanate and a diol or polyol; and (b) a curing agent incorporating diol, polyol, diisocyanate, polyisocyanate, modified isocyanate, diamine, polyamine, or mixtures of these; and 2) inducing crosslinking in the composition by adding thermal energy to the composition, so that the temperature of the composition is greater than a characteristic temperature of the modified isocyanate, to create a crosslinked polyurethane. The step of preparing the reaction product can incorporate using a reaction injection molding technique or a casting process.

Other features and advantages of the present invention should become apparent from the following detailed description of the preferred embodiments.

DETAILED DESCRIPTION OF THE PREFERRED EMBODIMENTS

The present invention is embodied in golf balls having cover or intermediate layers incorporating particular urethane compositions. Specifically, these compositions incorporate modified isocyanates, either as a precursor to a thermoplastic urethane, or as a separate crosslinking agent, or both. The resulting reaction product incorporates a crosslinked structure that provides for excellent ball properties. The present invention also resides in methods for making golf balls incorporating this reaction product. Because the original urethane is thermoplastic, the material can be prepared with ease of processing, while the crosslinked structure of the reaction product provides for improved ball properties. The compositions incorporating this reaction product are easy to use, and they provide flexibility in golf ball design to improve ball performance, such as hit feel and spin rate, without adversely affecting shear-cut resistance of the ball. The compositional also allows for scrap material not crosslinked to be salvaged for later use.

Modified isocyanates used for making the polyurethanes of the present invention generally are defined as chemical compounds containing isocyanate groups that are not reactive at room temperature, but that become reactive once they reach a characteristic temperature. The resulting isocyanates can act as crosslinking agents or chain extenders to form crosslinked polyurethanes. The degree of crosslinking is governed by type and concentration of modified isocyanate presented in the composition. The modified isocyanate used in the composition preferably is selected, in part, to have a characteristic temperature sufficiently high such that the urethane in the composition will retain its thermoplastic behavior during processing. Too low of a characteristic temperature will result in crosslinking of the composition before processing is completed, leading to process difficulties. Particular preferred examples of modified isocyanates include those marked under the trade name CRELAN by Bayer Corporation. Examples of those include: CRELAN TP LS 2147; CRELAN NI 2; isophorone diisocyanate (IPDI)-based uretdione-type crosslinker, such as CRELAN VP LS 2347; a combination of a uretdione adduct of IPDI and a partially $\epsilon$-caprolactam-modified IPDI, such as CRELAN VP 2386; a combination of isocyanate adducts modified by $\epsilon$-caprolactam and a carboxylic acid functional group, such as CRELAN VP LS 2181/1; a caprolactam-modified Desmodur diisocyanate, such as CRELAN NW5; and a Desmodur diisocyanate having a 3,5-dimethyl pyrazole modified isocyanate, such as CRELAN XP 7180. These modified isocyanates may be used either alone or in combination.

As described above, the thermoplastic urethane within the scope of the present invention can be obtained from the reaction product of a diol or a polyol and a conventional or modified isocyanate. For example, in one method within the scope of the present invention, polyol and isocyanate react to produce thermoplastic urethane, and this thermoplastic urethane then is reacted with a chain extender, including, but not limited to, modified isocyanate or a mixture of modified isocyanate with diol, polyol, diisocyanate, polyisocyanate, diamines, or polyamines. The designation of this reaction product as either thermoplastic urethane or thermoplastic polyurethane is irrelevant, as each may be reacted with modified isocyanate to produce the reaction product of the present invention. The present invention allows for use of thermoplastic urethanes lacking unsaturated hydrocarbons, because the modified isocyanates used do not require the presence of unsaturated bonds to promote crosslinking or polymerization in the thermoplastic urethane.

Golf ball cover and intermediate layers within the scope of the present invention include compositions incorporating the reaction product of a thermoplastic urethane with a modified isocyanate. These modified isocyanates serve as crosslinking agents (or chain extenders) that react with the thermoplastic urethanes in the composition, and they are not active below characteristic temperatures. Before the composition is exposed to sufficient thermal energy to reach the characteristic temperature of the modified isocyanate, the composition incorporating the thermoplastic urethane and modified isocyanate behaves as a thermoplastic material. Therefore, it can readily be formed into golf ball layers using conventional injection molding. However, when sufficient thermal energy is applied to bring the composition above the characteristic temperature of the modified isocyanate, crosslinking or chain extending reaction occurs, and the thermoplastic urethane is converted into crosslinked polyurethane. This polyurethane provides the performance advantages discussed above, such as improved scuff and cut resistance. In addition to use strictly as a crosslinking agent, the modified isocyanate also can be used, either alone or in combination with conventional isocyanates, to react with a diol or polyol to synthesize a urethane prepolymer incorporating the modified isocyanate. This prepolymer then is crosslinked as described above to form a crosslinked polyurethane product. Further, modified isocyanate can be used both as a precursor for the urethane prepolymer, and also as an added crosslinking agent.

As discussed above, the crosslink density (i.e., the degree of crosslinking) of the compositions of the present invention can be adjusted by varying the amount or type of modified isocyanate in the composition. The crosslink density also is controlled by the temperature to which the composition is brought during processing, as well as by the characteristic temperature of the modified isocyanate. Preferably, the ratio by weight of the thermoplastic urethane or the urethane precursors to that of the modified isocyanate used in the composition ranges between 99.9:0.1 and about 60:40, more preferably between 99.9:0.1 and about 70:30, even more preferably between about 98:2 and about 80:20, and most preferably between about 98:2 and about 90:10.

Non-limiting examples of thermoplastic polyurethanes suitable for use in the compositions of the present invention include ether and ester-type polyurethanes, such as those marketed under the trade name ESTANE by Noveon, Inc. Polyols suitable for use in the compositions of the present invention include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyol contains a polyol component using 1,6-hexanediol, 1,4-butanediol, 1,3-butanediol, neopentylglycol or 1,5-pentanediol. Polycarbonate polyols can be used either alone or in a combination with other polyols.

Polybutadiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Conventional (i.e. non-modified) isocyanates suitable for use in the compositions of the present invention include: trimethylene diisocyanate, tetramethylene diisocyanate, pentamethylene diisocyanate, hexamethylene diisocyanate, ethylene diisocyanate, diethylidene diisocyanate, propylene diisocyanate, butylenes diisocyanate, bitolylene diisocyanate, tolidine isocyanate, isophorone diisocyanate, dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis (cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis (isocyanatomethyl) cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4, 4'-diisocyanate, diphenyl sulfone-4,4'-diisocyanate, triphenylmethane 4,4,4"-triisocyanate, isocyanatoethyl methacrylate, 3 -isopropenyl-α,α-dimethylbenzyl-isocyanate, dichlorohexamethylene diisocyanate, ω, ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.

As discussed above, compositions within the scope of the present invention also can incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1, 3-hexanediol, cyclohexanediol, and 2-ethyl-2-(hydroxymethyl)-1,3-propanediol. Diamines also can be added to urethane prepolymer to function as chain extenders. Suitable diamines include: tetramethylenediamine, pentamethylenediamine, hexamethylenediamine, p,p'-methylenedianiline, p-phenylenediamine and others. Aromatic diamines have a tendency to provide a stiffer (i.e., having a higher Mooney viscosity) product than aliphatic or cycloaliphatic diamines. Suitable polyamines that can be used as chain extenders include primary, secondary, and tertiary amines, such as diamine, triamine and tetramine. Examples of these include: an aliphatic amine, such as hexamethylenediamine; an alicyclic amine, such as 3,3'-dimethyl-4,4'-diaminodicyclohexyl methane; or, an aromatic amine, such as 4,4'-methylene bis-2-chloroaniline, 2,2',3,3'-tetrachloro-4,4'-diaminophenyl methane or 4,4'-diaminodiphenyl; and 2,4,6-tris(dimethylaminomethyl) phenol. These chain extenders can be used either alone or in combination.

Compositions within the scope of the present invention also may include plasticizers. Examples of suitable plasticizers include: dioctyl phthalate (DOP), dibutyl phthalate (DBP), dioctyl adipate (DOA), triethylene glycol dibenzoate, tricresyl phosphate, dioctyl phthalate, aliphatic ester of pentaerythritol, dioctyl sebacate, and diisooctyl azelate. In addition to the material discussed above, compositions within the scope of the present invention can incorporate one or more polymers in addition to the thermoplastic urethane and crosslinking agent. These additional polymers may be added as need for a desired effect, such as softening an otherwise overly hard cover composition. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Particularly suitable plasticizers for use in the compositions within the scope of the present invention include: polyethylene-terephthalate, polybutyleneterephthalate, polytrimethylene-terephthalate, ethylene-carbon monoxide copolymer, polyvinyl-diene fluorides, polyphenylenesulfide, polypropylene-oxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene-(diene), dynamically vulcanized polypropylene/ethylene-propylene-diene-copolymer, thermoplastic vulcanizates based on ethylene-propylene-(diene), natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexylidicarboxylic acid, with (b) a diamine, such as ethylenediamine, tetramethylenediamine, pentamethylenediamine, hexamethylene-diamine or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-amino caproic acid, 9-aminononaoic acid, 11-aminoudecanoic acid or 12-aminododecanoic acid; or, (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46. Other preferred materials suitable for use as an additional material in compositions within the scope of the present invention include polyester elastomers marketed under the name SKYPEL by SK Chemicals of South Korea, or triblock copolymers marketed under the name HG-252 by Kuraray Corporation of Kurashiki, Japan. These triblock copolymers have at least one polymer block comprising an aromatic vinyl compound and at least one polymer block comprising a conjugated diene compound, and a hydroxyl group at a block copolymer. The materials listed above all can provide for particular enhancements to ball layers prepared within the scope of the present invention.

As mentioned above, ionomeric polymers often are found in covers and intermediate layers of golf balls. These ionomers also are well suited for blending into compositions within the scope of the present invention. Suitable ionomeric polymers (i.e., copolymer- or terpolymer-type ionomers) include α-olefin/unsaturated carboxylic acid copolymer-type ionomeric or terpolymer-type ionomeric resins that can be described as copolymer E/X/Y, where E represents ethylene, X represents a softening comonomer such as acrylate or methacrylate, and Y is acrylic or methacrylic acid. The acid moiety of Y is neutralized to form an ionomer by a cation such as lithium, sodium, potassium, magnesium, calcium, barium, lead, tin, zinc or aluminum. Also, a combination of such cations is used for the neutralization. Copolymeric ionomers are obtained by neutralizing at least portion of carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least portion of carboxylic groups in a terpolymer of an α-olefin, and an α,β-unsaturated carboxylic acid having 3 to 8 carbon atoms and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Terpolymeric ionomers include ionomers having varied acid contents and degrees of acid neutralization, neutralized by monovalent or bivalent cations discussed above. Examples of suitable ionomeric resins include those marketed under the name SURLYN manufactured by E.I. DuPont de Nemours & Company of Wilmington, Delaware, and IOTEK manufactured by Exxon Mobil Corporation of Irving, Tex.

Silicone materials also are well suited for blending into compositions within the scope of the present invention. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups such as phenyl, tolyl and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and, the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, New York, and Elastosil by Wacker Silicones of Adrian, Mich.

Other types of copolymers also may be added to compositions within the scope of the present invention. Examples of copolymers comprising epoxy monomers and which are suitable for use within the scope of the present invention include styrene-butadiene-styrene block copolymers, in which the polybutadiene block contains epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Compositions within the scope of the present invention also can include, in suitable amounts, one or more additional ingredients generally employed in golf balls and ball compositions. Agents provided to achieve specific functions, such as additives and stabilizers, can be present. Suitable ingredients include colorants, UV stabilizers, photostabilizers, antioxidants, colorants, dispersants, mold releasing agents, processing aids, and fillers. The compositions can incorporate, for example, inorganic fillers, such as titanium dioxide, calcium carbonate, zinc sulfide or zinc oxide. Additional fillers can be chosen to impart additional density to the compositions, such as zinc oxide, barium sulfate, tungsten or any other metallic powder having density higher than that of the base polymeric resin. Any organic or inorganic fibers, either continuous or non-continuous, also can be in the compositions. An example of these is silica-reinforcing filler. This filler preferably is selected from finely divided, heat-stable minerals, such as fumed and precipitated forms of silica, silica aerogels and titanium dioxide having a specific surface area of at least about 10 m$^2$/gram.

The various possible components of the compositions of the present invention, including thermoplastic urethane, diol, polyol, non-modified, or modified isocyanates (or the diol/polyol and/or non-modified isocyanates constituents) and modified isocyanate can be mixed together, with or without melting them. Dry blending equipment, such as a tumbler mixer. V-blender, or ribbon blender, can be used to prepare the composition. The modified isocyanate also can be added after addition of any of the additional materials discussed above. Materials can be added to the composition using a mill, internal mixer, extruder or combinations of these, with or without application of thermal energy to produce melting. In another method of manufacture of these composition, the modified isocyanate can be premixed with the thermoplastic urethane and/or constituent materials to produce a concentrate having a high concentration of modified isocyanate. Then, this concentrate can be introduced into a composition of thermoplastic urethane and/or urethane precursors using dry blending or melt mixing. The additional materials also can be added to a color concentrate, which then is added to the composition to impart a white color to golf ball. Instead of melt mixing, the modified isocyanate can be applied to the mixture of thermoplastic urethane by using methods such as dipping or spraying of the modified isocyanate onto half-cups of thermoplastic urethane, so that the thermoplastic urethane is coated with the modified isocyanate. This is particularly useful when the layer to be formed is relatively thin, so that a surface application of the modified isocyanate allows for chemical reaction to take place throughout the layer. The coating of modified isocyanate may also be applied to a layer of thermoplastic urethane already positioned on a core. In another method, thermoplastic urethane may be extruded, with or without any of the additional materials discussed above. Then, pellets of this thermoplastic urethane composition formed from this extrusion are sprayed with the modified isocyanate prior to molding. Any combination of the above-mentioned mixing methods can be used to produce a final composition within the scope of the present invention.

A preferred method within the scope of the present invention involves injection molding a core, intermediate layer, or cover of the composition into a cold mold without inducing heavy crosslinking. The product from this process then is compression-molded to induce partial or full crosslinking by use of thermal energy. In another preferred method, injection molding is used to inject the composition around a core positioned in a mold, in which thermal energy is applied to induce crosslinking. In yet another preferred method, an intermediate layer or a cover of the composition can be prepared by injection molding half-shells. The half shells are then positioned around a core and compression molded. The heat and pressure first melt the composition to seal the two half shells together to form a complete layer. Additional thermal energy induces crosslinking of the thermoplastic urethane. In another preferred method, half shells of the composition prior to addition of modified isocyanate are prepared. The half shells are coated with modified isocyanate and compression molded around a core to form a layer and induce crosslinking. In another preferred method, a layer of the composition prior to addition of modified isocyanate is positioned around a core to form a layer. The layer then is coated with modified isocyanate and compression molded to induce crosslinking.

In additional preferred methods of manufacture, known casting processes can be used. For example, a preferred method within the scope of the present invention incorporates preparing a urethane prepolymer as discussed above, and using it in a casting process. The prepolymer and the modified isocyanate are mixed together, placed in a cast, and then heated to a temperature above the characteristic temperature of the modified isocyanate, to form a layer of crosslinked polyurethane. Alternatively, polyols and either the modified isocyanate or a mixture of modified isocyanate and conventional isocyanate are introduced into a first mold half and allowed to polymerize and partially cure at a temperature above the characteristic temperature of the modified isocyanate. After the core is centered in the first mold half, a second mold half is filled with the same mixture. The first mold half then is inverted and placed over the second mold half to form a complete layer over the core. Then polymerization or crosslinking are completed by heating as described above, so that a complete layer of the crosslinked polyurethane product is produced. Another preferred casting method is to use a reaction injection molding (RIM) technique. In the method, polyols and either the modified isocyanate or a mixture of modified isocyanate and conventional isocyanate are introduced into a mold from separate tanks at a specified ratio. Then, polymerization or crosslinking reactions occur at a temperature above the characteristic temperature of the modified isocyanate.

In addition to the above, when used to form a cover layer, a preferred embodiment of the method involves preparing the cover layer using injection molding and forming dimples on the surface of the cover layer, while inducing full or partial crosslinking of the layer during injection molding. Alternately, the cover layer can be formed using injection molding without dimples, after which the cover layer is compression molded to form dimples and also induce full or partial crosslinking.

EXAMPLES

A series of trials were conducted on compositions incorporating an ether-type thermoplastic polyurethane either alone, or as part of the reaction product with a modified isocyanate. All of the balls incorporated ESTANE 58144. In addition, compositions 2 to 4 included 2, 4, and 6% by weight of a modified isocyanate; either CRELAN VP LS 2386, CRELAN VP LS 2181/1, or CRELAN NW5. The compositions were compounded using twin screw extrusion, followed by injection molding to prepare the specimens for the mechanical testing. The mechanical tests were performed in accordance with ASTM standards D-638, D-790, and D-2240. Results of these tests are summarized below in Table 1.

TABLE 1

| Comp. No. | Modified Isocyanate | Tensile Strength (psi) | Elastic Modulus (ksi) | Ultimate Elongation (%) | Flexural modulus (psi) | Hardness Shore D |
|---|---|---|---|---|---|---|
| 1 | None | 4,762 | 21 | 570 | 31,271 | 60 |
| 2 | 2% LS 2386 | 5,277 | 33 | 542 | 36,740 | 64 |
|  | 4% LS 2386 | 5,565 | 48 | 528 | 35,268 | 66 |
|  | 6% LS 2386 | 5,152 | 46 | 582 | 37,514 | 65 |
| 3 | 2% LS 2181/1 | 5,064 | 34 | 607 | 35,933 | 65 |
|  | 4% LS 2181/1 | 4,797 | 43 | 519 | 33,407 | 65 |
|  | 6% LS 2181/1 | 4,824 | 45 | 489 | 36,370 | 67 |
| 4 | NWS | 5,017 | 30 | 573 | 35,192 | 65 |

The data in Table 1 illustrate that the use of the modified isocyanate provides for improved mechanical properties over use of thermoplastic polyurethane alone. Specifically, tensile strength, elastic modulus, flexural modulus, and hardness all increase, while ultimate elongation remains essentially similar.

These test results show that compositions within the scope of the present invention can first be easily processed as a thermoplastic material, and then be induced to crosslink, to achieve excellent durability. These final properties can be optimized for specific golf ball applications by adjusting the type and ratio of urethane, modified isocyanate, and any additional materials in the composition. Additionally, the degree of crosslinking in the composition can be adjusted by selection of the processing method and conditions used in making the compositions.

Although the invention has been disclosed in detail with reference only to the preferred embodiments, those skilled in the art will appreciate that additional compositions and methods can be made without departing from the scope of the invention. Accordingly, the invention is defined only by the claims set forth below.

We claim:

1. A golf ball comprising a core and a cover layer encasing the core, wherein the golf ball comprises a composition the reaction product of:
   a thermoplastic urethane formed as a reaction product of diol or a polyol with an isocyanate; and
   a modified isocyanate selected from the group of; isophorone diisocyanate (IPDI)-based uretdione-type crosslinker, an ε-caprolactam-modified IPDI; a carboxylic acid-modified IPDI; and mixtures thereof.

2. The golf ball of claim 1, wherein the thermoplastic urethane further comprises at least one chain extender.

3. The golf ball of claim 2, wherein the at least one chain extender comprises diol, polyol, diisocyanate, polyisocyanate, diamine, polyamine, or mixtures thereof.

4. The golf ball of claim 1, wherein the polyol comprises polyester polyol, polycarbonate polyol, polyether polyol, polybutadiene polyol, or mixtures thereof.

5. The golf ball of claim 1, wherein the ratio in the composition by weight of thermoplastic urethane to modified isocyanate ranges between 99.0:0.1 and about 60:40.

6. The golf ball of claim 5, wherein the ratio in the composition by weight of thermoplastic urethane to modified isocyanate ranges between 99.9:0.1 and about 70:30.

7. The golf ball of claim 6, wherein the ratio in the composition by weight of thermoplastic urethane to modified isocyanate ranges between 98:2 and about 80:20.

8. The golf ball of claim 7, wherein the ratio by weight of thermoplastic urethane to modified isocyanate ranges between about 98:2 and about 90:10.

9. The golf ball of claim 1, wherein the composition further comprises plasticizer.

10. The golf ball in claim 1, wherein the composition further comprises UV stabilizers, photostabilizers, antioxidants, colorants, dispersants, mold releasing agents, processing aids, fillers, or mixtures thereof.

11. The golf ball of claim 1, wherein the composition further comprises ionomeric polymer, non-ionomeric polymer, polyamide, silicone, styrenic-copolymers, or mixtures thereof.

12. The golf ball of claim 1, wherein the thermoplastic urethane comprises ester-type thermoplastic urethane, ether-type thermoplastic urethane, or mixtures thereof.

13. A golf ball comprising a core and a cover layer encasing the core, wherein the golf ball comprises a composition comprising the reaction product of:
   a thermoplastic urethane formed as a reaction product of a diol or a polyol with an isocyanate; and
   a modified isocyanate selected from the group consisting of; isophorone diisocyanate (IPDI)-based uretdione-type crosslinker, an ε-caprolactam-modified IPDI; a carboxylic acid-modified IPDI; and mixtures thereof;
   wherein the thermoplastic urethane is substantially free, of unsaturated hydrocarbons.

14. The golf ball of claim 13, wherein the thermoplastic urethane further comprises at least one chain extender.

15. The golf ball of claim 14, wherein the chain extender comprise diol, polyol, diisocyanate, polyisocyanate, diamine, polyamine, or mixtures thereof.

16. The golf ball of claim 13, wherein the polyol comprises polyester polyol, polycarbonate polyol, polyether polyol, polybutadiene polyol, or mixture thereof.

17. The golf ball of claim 13, wherein the ratio in the composition by weight of thermoplastic urethane to modified isocyanate range between 99.9:0.1 and about 60:40.

18. The golf ball of claim 17, wherein the ratio in the composition by weight of thermoplastic urethane to the to modified isocyanate ranges between 99.9:0.1 and about 70:30.

19. The golf ball of claim 18, wherein the ratio in the composition by weight of thermoplastic urethane to the to modified isocyanate range between about 98:2 and about 80:20.

20. The golf ball of claim 19, wherein the ratio in the composition by weight of thermoplastic urethane to modified isocyanate ranges between about 98:2 and about 90:20.

21. The golf ball of claim 13, wherein the composition further comprises plasticizer.

22. The golf ball of claim 13, wherein the composition further comprises ionomeric polymer, non-ionomeric polymer polyamide, silicone, styrenic-copolymers, or mixtures thereof.

23. The golf ball in claim 13, wherein the composition further comprises UV stabilizers, photostabilizers, antioxidants, colorants, dispersants, mold releasing agents, processing aids, fillers, or mixtures thereof.

24. The golf ball of claim 13, wherein the cover layer comprises the composition.

25. The golf ball of claim 13, further comprising one or more intermediate layers situated between the core and the cover layer, at least one of the one or more intermediate layers comprising the composition.

26. The golf ball of claim 13, wherein the core comprises an inner core and one or more outer cores encasing the inner core.

27. The golf ball of claim 13, wherein the core comprises liquid.

28. The golf ball of claim 13, further comprising a layer of rubber thread situated between the core and the cover layer of the ball.

29. The golf ball of claim 13, wherein the thermoplastic urethane comprises ester-type thermoplastic urethane, ether-type thermoplastic urethane, or mixture thereof.

* * * * *

UNITED STATES PATENT AND TRADEMARK OFFICE
CERTIFICATE OF CORRECTION

PATENT NO. : 6,939,924 B2
DATED : September 6, 2005
INVENTOR(S) : Hyun Jin Kim et al.

It is certified that error appears in the above-identified patent and that said Letters Patent is hereby corrected as shown below:

Column 5,
Line 26, "o f" should be -- of --.
Line 29, "diieocyanate" should be -- diisocyanate --.
Line 30, "djjscoyanate" should be -- diisocyanate --.

Column 7,
Line 65, "marked" should be -- marketed --.
Line 66, "those" should be -- these --.

Column 10,
Line 58, "4,4,4"" should be -- 4, 4', 4" --.

Column 12,
Line 43, "6-amino caproic acid" should read -- 6-aminocaproic acid --.

Column 14,
Line 47, "isocyanates" should be -- isocyanate --.
Lines 51 and 57, "composition" should be -- compositions --.

Column 16,
Table 1, last line, "NWS" should be -- NW5 --.

Column 17,
Line 19, after "composition," insert -- comprising --.
Line 22, before "diol," insert -- a --.
Line 23, "group of;" should be -- group consisting of: --.
Line 25, "crosslinker," should be -- crosslinker: --.
Line 38, "99.0:0.1" should be -- 99.9:0.1 --.
Line 44, after "between," insert -- about --.

UNITED STATES PATENT AND TRADEMARK OFFICE
CERTIFICATE OF CORRECTION

PATENT NO. : 6,939,924 B2
DATED : September 6, 2005
INVENTOR(S) : Hyun Jin Kim et al.

It is certified that error appears in the above-identified patent and that said Letters Patent is hereby corrected as shown below:

<u>Column 18,</u>
Line 4, "of;" should be -- of: --.
Line 5, "crosslinker," should be -- crosslinker; --.
Line 7, after "free," insert -- of --.
Line 13, "comprise" should be -- comprises --.
Line 17, "mixture" should be -- mixtures --.
Lines 20 and 28, "range" should be -- ranges --.
Line 32, "90:20" should be -- 90:10 --.
Line 36, "polymer polyamide:" should be -- polymer, polyamide --.
Line 60, "mixture" should be -- mixtures --.

Signed and Sealed this

Twentieth Day of December, 2005

JON W. DUDAS
*Director of the United States Patent and Trademark Office*

UNITED STATES PATENT AND TRADEMARK OFFICE
CERTIFICATE OF CORRECTION

PATENT NO.     : 6,939,924 B2
DATED          : September 6, 2005
INVENTOR(S)    : Hyun Jin Kim et al.

It is certified that error appears in the above-identified patent and that said Letters Patent is hereby corrected as shown below:

Column 5,
Line 26, "o f" should be -- of --.
Line 29, "diieocyanate" should be -- diisocyanate --.
Line 30, "djjscoyanate" should be -- diisocyanate --.

Column 7,
Line 65, "marked" should be -- marketed --.
Line 66, "those" should be -- these --.

Column 10,
Line 58, "4,4,4,"" should be -- 4,4',4" --.

Column 12,
Line 43, "6-amino caproic acid" should be -- 6-aminocaproic acid --.

Column 14,
Line 47, "isocyanates" should be -- isocyanate --.
Lines 51 and 57, "composition" should be -- compositions --.

Column 16,
Table 1, last line, "NWS" should be -- NW5 --.

Column 17,
Line 19, after "composition," insert -- comprising --.
Line 22, before "diol," insert -- a --.
Line 23, "group of;" should be -- group consisting of: --.
Line 25, "crosslinker," should be -- crosslinker: --.
Line 38, "99.0:0.1" should be -- 99.9:0.1 --.
Line 44, after "between," should be -- about --.

UNITED STATES PATENT AND TRADEMARK OFFICE
CERTIFICATE OF CORRECTION

PATENT NO. : 6,939,924 B2
DATED : September 6, 2005
INVENTOR(S) : Hyun Jin Kim et al.

It is certified that error appears in the above-identified patent and that said Letters Patent is hereby corrected as shown below:

<u>Column 18,</u>
Line 4, "of:" should be -- of: --.
Line 5, "crosslinker," should be -- crosslinker; --.
Line 7, after "free," insert -- of --.
Line 13, "comprise" should be -- comprises --.
Line 17, "mixture" should be -- mixtures --.
Lines 20 and 28, "range" should be -- ranges --.
Line 32, "90:20" should be -- 90:10 --.
Line 36, "polymer polyamide:" should be -- polymer, polyamide --.
Line 60, "mixture" should be -- mixtures --.

Signed and Sealed this

Twenty-seventh Day of December, 2005

JON W. DUDAS
*Director of the United States Patent and Trademark Office*